(12) United States Patent
Nishikawa et al.

(10) Patent No.: US 6,335,595 B1
(45) Date of Patent: Jan. 1, 2002

(54) PLASMA GENERATING APPARATUS

(75) Inventors: Kazuyasu Nishikawa; Hiroki Ootera; Mutumi Tuda, all of Hyogo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/641,340

(22) Filed: Aug. 18, 2000

(30) Foreign Application Priority Data

Oct. 25, 1999 (JP) ............................................. 11-302259

(51) Int. Cl.$^7$ ................................................. H01J 7/24
(52) U.S. Cl. ............................ 315/111.21; 315/111.41; 315/111.81
(58) Field of Search ........................ 315/111.21, 111.41, 315/111.71, 111.91, 111.01, 111.81

(56) References Cited

U.S. PATENT DOCUMENTS

| | | | |
|---|---|---|---|
| 4,916,361 A | * | 4/1990 | Schumacher et al. ... 315/111.21 |
| 5,182,496 A | | 1/1993 | Manheimer et al. .... 315/111.41 |
| 5,814,942 A | | 9/1998 | Mathew ................. 315/111.41 |

FOREIGN PATENT DOCUMENTS

JP         11-87091         3/1999

OTHER PUBLICATIONS

Mathew, "Electronically Steerable Plasma Mirror Based Radar–Concept and Characteristics", IEEE AES Systems Magazine, Oct. 1996, pp. 38–44.

* cited by examiner

*Primary Examiner*—Don Wong
*Assistant Examiner*—Tuyet T. Vo
(74) *Attorney, Agent, or Firm*—Leydig, Voit, & Mayer, Ltd.

(57) ABSTRACT

A plasma generating apparatus includes a vacuum container, an anode and a cathode including multiple electrodes, a power supply for applying a high voltage to the anode and the cathode, and switching elements for switching the electrodes in the anode and the cathode to which the high voltage is applied. The combination of the electrodes are switched by switching elements to form a sheet plasma at any desired angle relative to directional electromagnetic waves.

10 Claims, 17 Drawing Sheets

2a    9a 2a    9a 2a  9a 2a  9a

PLASMA GENERATING APPARATUS

BACKGROUND OF THE INVENTION

1. Field of the Invention

The present invention relates to a plasma generating apparatus, and more specifically, to a plasma generating apparatus which can be used in a radar system and which generates a sheet plasma that can be used as a reflecting mirror for electromagnetic waves.

2. Description of the Background Art

A radar system in which a sheet plasma is used as a reflecting mirror for electromagnetic waves is disclosed in U.S. Pat. Nos. 5,182,496 and 5,814,942. These references describe a method and a device for generating a sheet plasma by applying a high voltage between a cathode and an anode.

One angle control method for the sheet plasma is described in an article from IEEE AES System Magazine (October, 1996, p. 38). This article describes a control method setting the sheet plasma at a desired elevation angle with convention electromagnetic coils.

Moreover, Japanese Patent Laying-Open No. 11-087091 discloses a control method in which a laser beam irradiates a cathode at different angles and in which secondary electrons emitted from the cathode aid the plasma generation as well as set a desired azimuth.

The above-described conventional angle control of the sheet plasma involves the following problems since an electromagnetic coil and a laser are required.

Angle control of a sheet plasma by the combination of a plurality of electromagnetic coils presents the problem of increased complexity and size of the device. In addition, when providing a large number of electromagnetic coils in order to improve the angle precision, the effective area of the antenna serving as a plasma mirror is reduced so that the antenna gain is decreased. Further, when a laser is used for angle control of the sheet plasma, the provision of a plurality of lasers in the periphery of the cathode to improve precision results in an unfavorable increase in the device size.

SUMMARY OF THE INVENTION

The present invention is made to solve the above problems, and an object of the present invention is to perform the angle control of a sheet plasma with a simple configuration.

According to one aspect of the present invention, the plasma generating apparatus includes a chamber, an anode, a cathode, a power supply, and first and second switching elements. The anode is provided within the chamber, and includes a plurality of first electrodes. The cathode is provided within the chamber, and includes a plurality of second electrodes. From the power supply, a voltage is applied to first and second electrodes to form a sheet plasma that reflects the directional electromagnetic waves. The first and second switching elements switch between the groups of the first and second electrodes to which the voltage from the power supply is applied so as to change the angle and the shape of the sheet plasma. The first and second electrodes, for instance, are respectively arranged in a matrix. Moreover, the angle of the sheet plasma herein refers to the angle of the sheet plasma relative to the electromagnetic waves that enter the plasma generating apparatus.

Since the first and second switching elements are provided to the plasma generating apparatus as described above, certain groups of first and second electrodes to which a high voltage is applied can be switched to other groups of first and second electrodes, for example. Thus, the position in which the sheet plasma is formed and the angle of the sheet plasma relative to the electromagnetic waves can be changed so that not only the angle control but also the shape control of the sheet plasma can be performed.

According to another aspect of the present invention, the plasma generating apparatus includes a chamber, an anode, a cathode, a power supply, and a driving element. The anode and the cathode are provided within the chamber. From the power supply, a voltage is applied to the anode and the cathode to form a sheet plasma between the anode and the cathode that reflects the directional electromagnetic waves. The driving element drives at least one of the anode and the cathode to change the angle of the sheet plasma. Examples of the driving element include a rotation mechanism for rotating at least one of the anode and the cathode, and a tilting mechanism for tilting at least one of the anode and the cathode.

By providing a driving element as described above, at least one of the anode and the cathode can be driven. As a result, the angle of the sheet plasma formed between the anode and the cathode can be controlled. For instance, the angle control of the sheet plasma in the azimuth direction can be performed by rotating the anode or the cathode. Moreover, the angle control of the sheet plasma in the direction of elevation angle can be performed by tilting the anode and the cathode by a prescribed angle.

According to a further aspect of the present invention, the plasma generating apparatus includes a chamber, an anode, a cathode, a power supply, first and second magnets, and a magnet driving element. The anode and the cathode are provided within the chamber. From the power supply, a voltage is applied to the anode and the cathode to form a sheet plasma between the anode and the cathode that reflects the directional electromagnetic waves. The first magnet is provided on the anode, and the second magnet is provided on the cathode. The magnet driving element drives at least one of the first and second magnets to change the angle of the sheet plasma. The magnet driving element, for instance, includes a rotation mechanism for rotating at least one of the first and second magnets, and a moving mechanism for shifting at least one of these first and second magnets. Moreover, a typical example of the magnet is a permanent magnet.

By providing a magnet driving element as described above, a magnet can be rotated or shifted on an anode and a cathode. Thus, the direction of magnetic field lines and the position in which the magnetic field lines are generated can be changed such that the angle control of the sheet plasma can be performed.

In the above aspects of the present invention, the voltage, for instance, is a pulse voltage, a radio-frequency voltage, or a direct current voltage. In addition, the shape of at least one of the cathode and the anode is typically a flat-plate shape. At least one of the opposing surfaces formed by the cathode and the anode may be a curved surface, however. For instance, both of the opposing surfaces formed by the cathode and the anode may form paraboloids. In this case, the sheet plasma can be angle-controlled in the direction of the elevation angle.

According to a still further aspect of the present invention, the plasma generating apparatus includes a chamber, an anode, a cathode, a dielectric, a radio-frequency power supply, and a dielectric driving element. The dielectric is provided within the chamber. The high-frequency power supply applies a high frequency to the dielectric so as to form on a surface of the dielectric a sheet plasma that reflects the directional electromagnetic waves. The dielectric driving element drives the dielectric to change the angle of the sheet plasma.

A surface wave plasma can be formed on a surface of a dielectric plate by propagating a high frequency electromagnetic wave in the dielectric plate. In order to propagate the electromagnetic wave in the dielectric plate, for instance, a high-frequency power supply and a high-frequency transmission system may be provided. The surface wave plasma forms the sheet plasma of the present invention. By providing a dielectric driving mechanism for driving the dielectric plate, the dielectric plate can be tilted or rotated so that the sheet plasma can be angle-controlled not only in the azimuthal direction but also in the direction of the elevation angle.

Preferably, a member formed of a high-frequency electromagnetic wave non-absorbing material (for instance, a metal plate) or a high-frequency electromagnetic wave absorbing material is provided on one surface of the dielectric. Thus, the formation of the surface wave plasma on one surface can be prevented, and a sheet plasma of the desired density can be obtained at a low power.

In addition, the surface of the dielectric on which the sheet plasma is to be formed may be a curved surface. As a result, a sheet plasma having a parabolic shape, for instance, can be formed, facilitating the selection of the setup positions of a transmitter and a receiver.

According to a still another aspect of the present invention, the plasma generating apparatus includes a chamber, an anode and a cathode, a power supply, a high-frequency electromagnetic wave supply element, and a moving mechanism. The anode and the cathode are provided within the chamber. From the power supply, a voltage is applied to the anode and the cathode to form a low-density plasma between the anode and the cathode. The high-frequency electromagnetic wave supply element supplies a high-frequency electromagnetic wave into the low-density plasma so that a high-density sheet plasma that reflects the directional electromagnetic waves is formed. The moving mechanism moves the high-frequency supply electromagnetic wave element to change the position in which the high-density sheet plasma is formed. Examples of the high-frequency electromagnetic wave supply element include a high-frequency power supply and a high-frequency electromagnetic wave radiation antenna. In this case, the position of the high-frequency electromagnetic wave radiation antenna is shifted by the moving mechanism.

By propagating a high-frequency electromagnetic wave into the low-density plasma and allowing the high-frequency electromagnetic wave to be absorbed by the low-density plasma as described above, a high-density sheet plasma can be formed. This high-density sheet plasma can reflect the directional electromagnetic waves. By providing the moving mechanism, the high-frequency supply element can be moved so that the position in which the high-density sheet plasma is formed can be changed as a result. Thus, the angle control of the sheet plasma can be performed.

According to a still further aspect of the present invention, the plasma generating apparatus includes a chamber, an anode and a cathode, a power supply, and a plurality of high-frequency supply elements. The anode and the cathode are provided within the chamber. From the power supply, a voltage is applied to the anode and the cathode to form a low-density plasma between the anode and the cathode. The plurality of high-frequency supply elements supply a high-frequency electromagnetic wave into the low-density plasma so as to form a high-density sheet plasma that reflects the directional electromagnetic waves.

By providing a plurality of high-frequency supply elements as described above, a desired high-frequency supply element alone can be operated selectively. Thus, the angle control of the high-density sheet plasma can be performed.

According to a still another aspect of the present invention, the plasma generating apparatus includes a chamber, an electron beam source, a metal plate, a nozzle, and a nozzle driving element. The electron beam source supplies the electron beam into the chamber. The metal plate is provided within the chamber. The nozzle directs the electron beam toward the metal plate so that a sheet plasma that reflects the directional electromagnetic waves is formed. The nozzle driving element drives the nozzle to change the angle of the sheet plasma.

By providing the nozzle driving element as described above, the nozzle can be rotated or tilted. Thus, the electron beam plasma can be jet out in any desired direction so that the angle control of the sheet plasma can be performed.

According to a still further aspect of the present invention, the plasma generating apparatus includes a chamber, a plasma source, a metal plate, a nozzle, and a nozzle driving element. The plasma source supplies a plasma into the chamber. The metal plate is provided within the chamber. The nozzle directs the plasma toward the metal plate so as to form a sheet plasma that reflects the directional electromagnetic waves. The nozzle driving element drives the nozzle to change the angle of the sheet plasma.

In the above aspect, since the nozzle can be rotated or tilted, the plasma can be jet out in any desired direction so that the angle control of the sheet plasma can be performed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The embodiments of the present invention will be described below with reference to FIGS. 1 to 12.

First Embodiment

Figure 1:
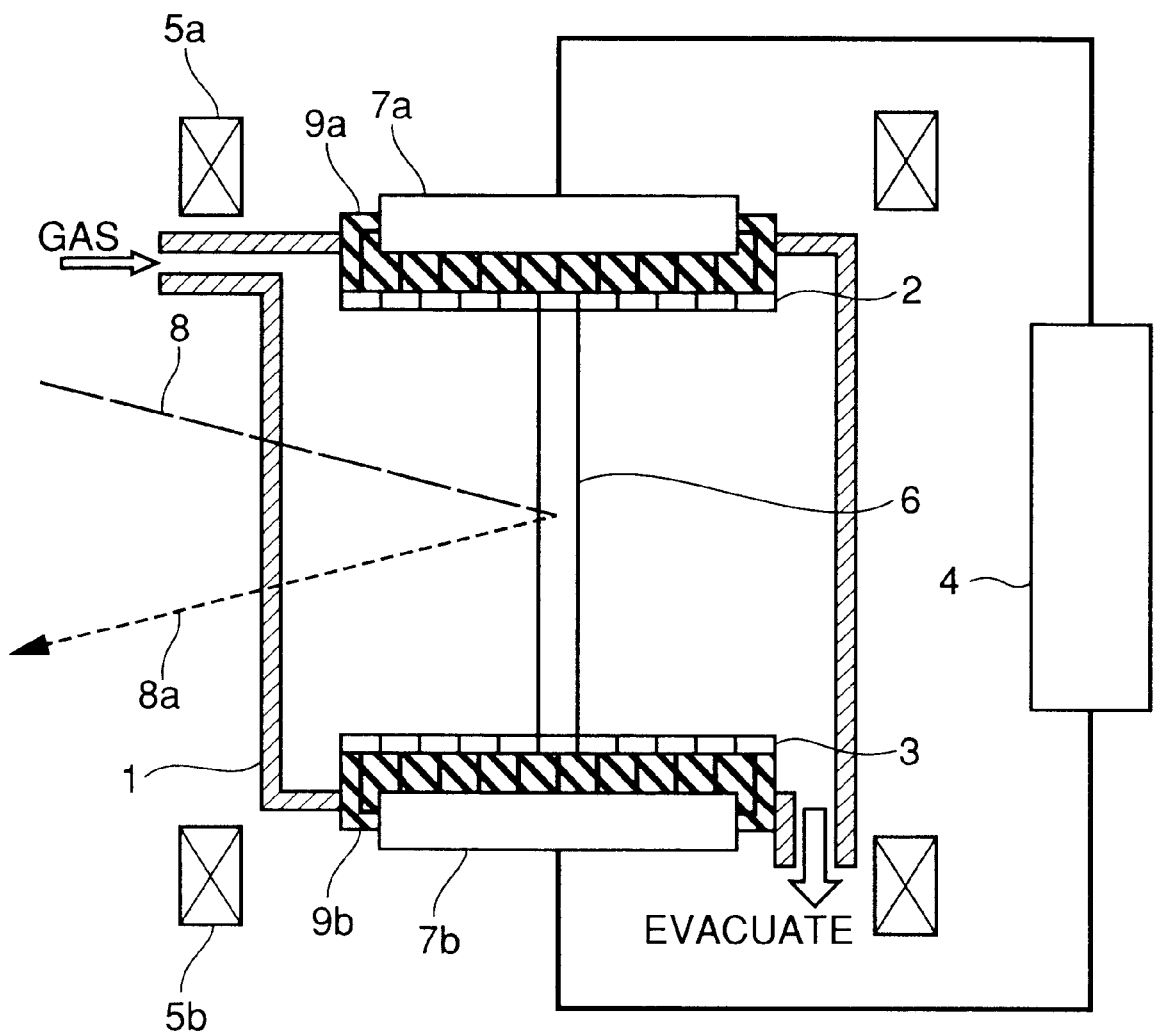
FIG. 1 is a cross sectional view representing the arrangement of a plasma generating apparatus according to a first embodiment of the present invention.

FIG. 1 is a cross sectional view representing the arrangement of a plasma generating apparatus according to the first embodiment of the present invention.

As shown in FIG. 1, the plasma generating apparatus includes a vacuum container (chamber) 1, an anode 2 having a plurality of first electrodes, a cathode 3 having a plurality of second electrodes, a high-voltage power supply 4 for applying a high voltage to anode 2 and cathode 3, electromagnetic coils 5a and 5b, switching elements 7a and 7b for switching the groups of the first electrodes and the second electrodes to which the voltage is applied, and insulating plates 9a and 9b for preventing short-circuiting among the first electrodes and among the second electrodes.

According to the first embodiment, vacuum container 1 has a cylindrical shape, for example, with an inner diameter being 40 to 50 cm and the height being 30 to 50 cm, and has a wall surface in the direction of incidence and reflection of the electromagnetic waves formed of an electromagnetic wave-propagating material.

Anode 2 and cathode 3 each have a flat-plate shape, and for instance have a disc-like shape or a square planar shape.

Switching element 7a switchingly connects high-voltage power supply 4 to each of the first electrodes. More specifically, switching element 7a insulates the high voltage application to one first electrode and applies the high voltage to another first electrode. In a similar manner, switching element 7b switchingly connects high-voltage power supply 4 to each of the second electrodes.

In the plasma generating apparatus thus formed, a rare gas, such as an argon gas, or air is introduced into vacuum container 1, and a high voltage is applied between cathode 2 and anode 3 by high-voltage power supply 4 to form a sheet plasma 6. The electron density and thickness required of the sheet plasma to serve as a plasma mirror relative to directional electromagnetic waves 8 at 10 GHz, for instance, are $1.24 \times 10^{11}$ cm$^{-3}$ and above and 4.8 mm or greater, respectively.

Electromagnetic coils 5a and 5b prevent the diffusion of sheet plasma 6 toward a wall of vacuum container 1, while an appropriate applied voltage from high-voltage power supply 4 ensures the necessary electron density and thickness of the sheet plasma.

Directional electromagnetic waves 8 that enter from outside the device are reflected by sheet plasma 6 and are received as reflected electromagnetic waves 8a, for instance, by a receiver, not shown. The same is true when directional electromagnetic waves 8 from a radiation antenna enter sheet plasma 6 and reflected electromagnetic waves 8a are radiated toward a target.

In addition, high-voltage power supply 4 is one of a direct current power supply, an alternating current power supply, and a high-frequency power supply, and may be a pulse power supply that applies a high voltage only during the time in which the electromagnetic waves enter sheet plasma 6. Moreover, vacuum container 1 is evacuated by a pump not shown, and the attainable degree of vacuum is 1.3 Pa and below.

Figure 2:
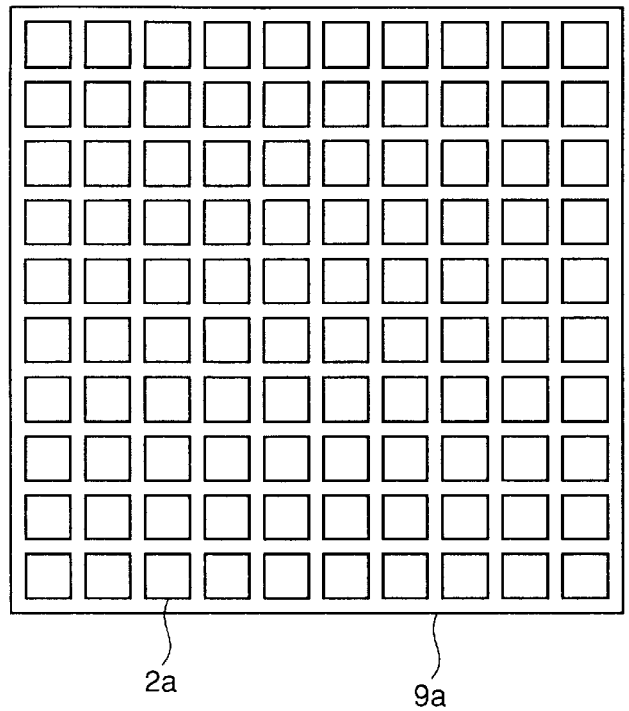
FIG. 2 is a diagram illustrating an example of the arrangement of the electrodes according to the first embodiment of the present invention.

According to this embodiment, anode 2 and cathode 3 are formed by a plurality of electrodes in order to angle-control reflected electromagnetic waves 8a to any desired direction of reflection. For instance, FIG. 2 shows a schematic diagram of anode 2. In FIG. 2, anode 2 includes a plurality of first electrodes 2a arranged in an array (a matrix) and an insulating plate 9a for preventing short-circuiting among first electrodes 2a. Similarly, cathode 3 includes a plurality of second electrodes and an insulating plate 9b for preventing short-circuiting among the second electrodes.

Figure 3:
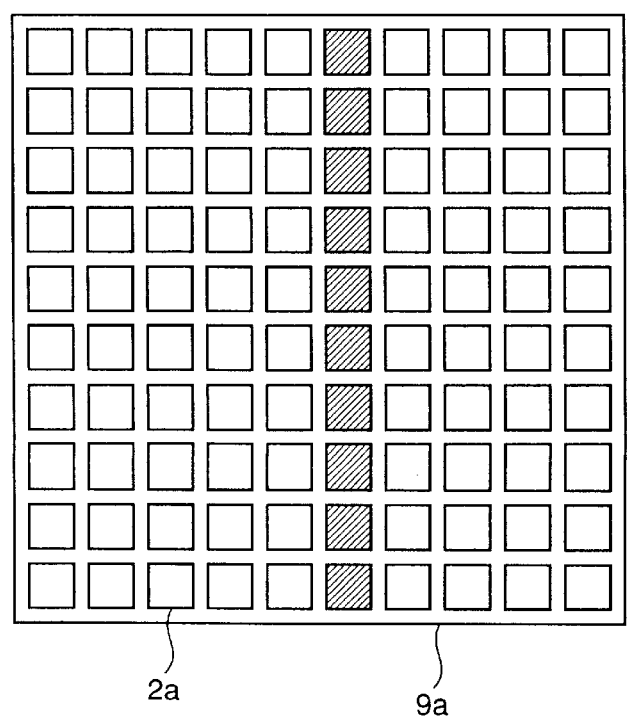
FIG. 3 is a diagram related to the description of an angle control method of the plasma generating apparatus shown in FIG. 1.

A voltage is applied to any given first electrode 2a and the second electrode directly below it to form a plasma between these electrodes. Thus, as shown in FIG. 3, a voltage can be applied between a plurality of first electrodes 2a shown as squares with hatching and the second electrodes immediately below them to produce sheet plasma 6.

Figure 4:
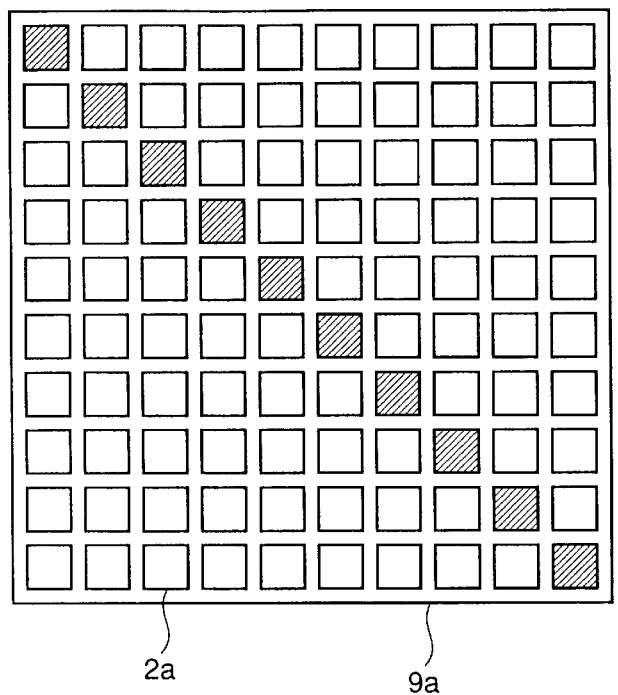
FIG. 4 is a diagram related to the description of an angle control method of the plasma generating apparatus shown in FIG. 1.

Next, a plurality of first electrodes 2a is selected anew by switching element 7a and a voltage is applied to these first electrodes 2a and to the second electrodes immediately below them to form sheet plasma 6 shown in FIG. 4. The position of sheet plasma 6 shown in FIG. 4 is obtained by rotating sheet plasma 6 shown in FIG. 3 by 45° in the azimuthal direction. Thus, according to the present invention, the angle of sheet plasma 6 can be controlled in the azimuthal direction.

Figure 5:
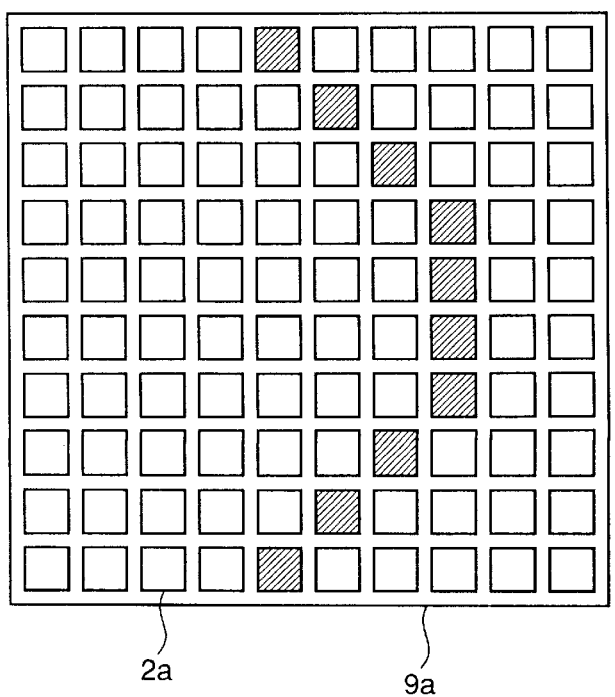
FIG. 5 is a diagram illustrating an example of the shape of the sheet plasma that can be formed by the plasma generating apparatus shown in FIG. 1.

Moreover, the shape, the position, and the like of sheet plasma 6 can be changed with an appropriate selection of first and second electrodes. For instance, as shown in FIG. 5, sheet plasma 6 having a shape close to a parabolic shape can be obtained. In this case, the focus of the electromagnetic waves can be determined so that a radiator or a receiver may be positioned accordingly.

As described above, switching elements 7a and 7b serving as electric switches can be used to effect rapid application and interruption of the application of a voltage on any given first and second electrodes. As a result, a desired sheet plasma 6 can be rapidly formed or extinguished.

When employing the DC (direct current) discharge (DC pulse discharge), anode 2 may be formed in an array and cathode 3 as one flat plate when applying a positive voltage, whereas anode 2 may be formed as one flat plate and cathode 3 as an array when applying a negative voltage.

In addition, the sizes of first and second electrodes is determined, for instance, by the thickness of the plasma required relative to the incident directional electromagnetic waves 8 and by the observation precision required by the radar performance.

Moreover, the above-described plasma generating apparatus can be used in a radar system. In this case, the fine adjustment of the angle in the radar system can be performed by moving the receiver or the transmitter to a certain extent.

As seen from the above, according to this embodiment, the position of formation, the shape, and the angle of sheet plasma 6 can be changed so that the angle control of a plasma mirror can be performed as a result.

Second Embodiment

Next, the second embodiment of the present invention will be described. In this section, a method of angle control of sheet plasma 6 in the direction of the elevation angle will be described.

Figure 6:
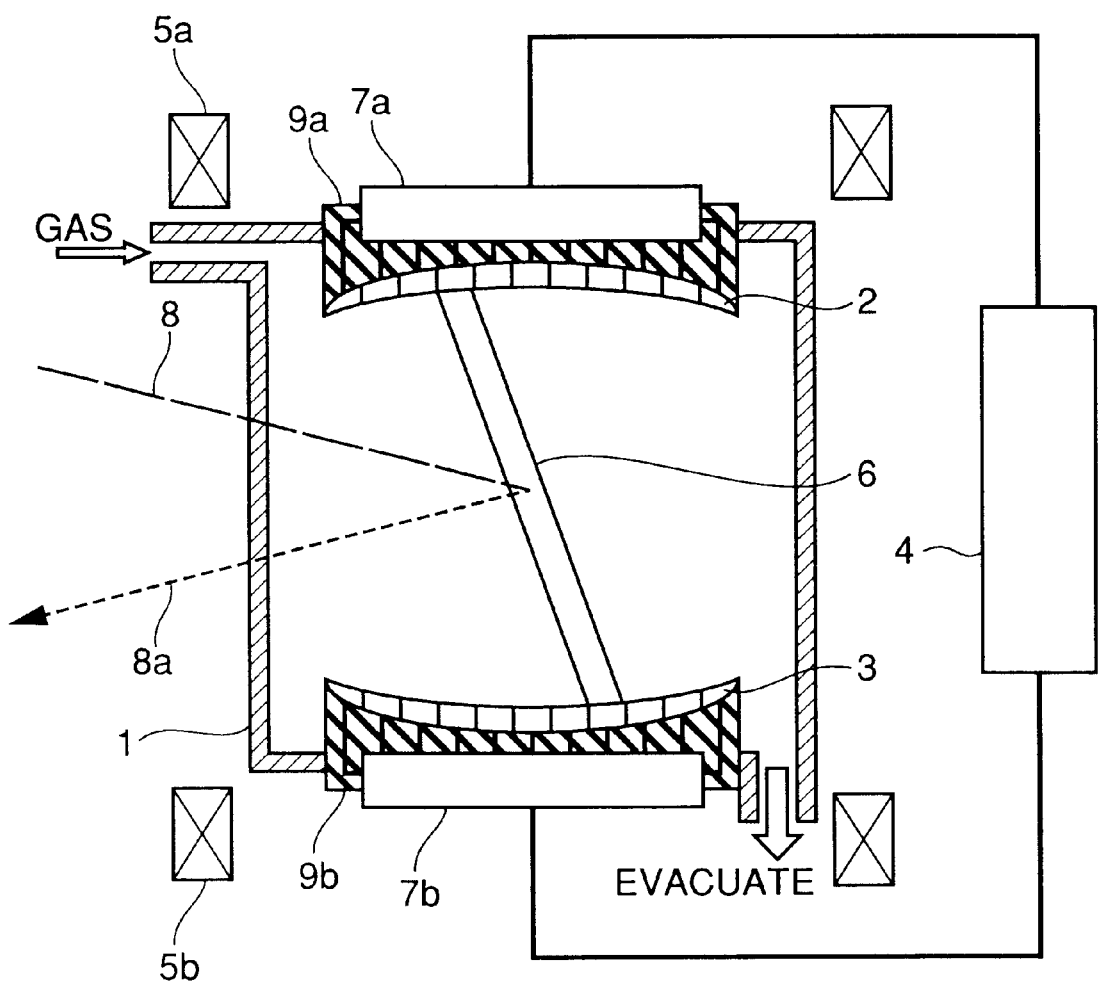
FIG. 6 is a cross sectional view representing the arrangement of a plasma generating apparatus according to a second embodiment of the present invention.

FIG. 6 is a cross sectional view representing the arrangement of the plasma generating apparatus according to the second embodiment of the present invention. The plasma generating apparatus according to second embodiment differs from the plasma generating apparatus according to the first embodiment in that the opposing surfaces of anode 2 and cathode 3 respectively form a paraboloid as a whole. The paraboloid on anode 2 side is formed by the surfaces of a plurality of first electrodes, and the paraboloid on cathode 3 side is formed by the surfaces of a plurality of second electrodes.

Thus, by forming both the opposing surfaces of anode 2 and cathode 3 as curved surfaces, a voltage can be applied to a first electrode and a second electrode in positions shifted in the horizontal direction (right and left in FIG. 6) to produce sheet plasma 6 between these electrodes as shown in FIG. 6. Thus, sheet plasma 6 can be tilted in the direction of the elevation angle as compared with the case shown in FIG. 1. Furthermore, one of anode 2 and cathode 3 may have a curved surface, and at least one of the opposing surfaces of anode 2 and cathode 3 may have a concavely curved surface.

As described above, according to this embodiment, sheet plasma 6 can be tilted in the direction of the elevation angle by appropriately selecting first and second electrodes by the switching of switching elements 7a and 7b. Thus, electromagnetic waves 8 that enter from above or below the device can be reflected by a plasma mirror which is angle-controlled in the direction of the elevation angle.

Third Embodiment

Figure 7:
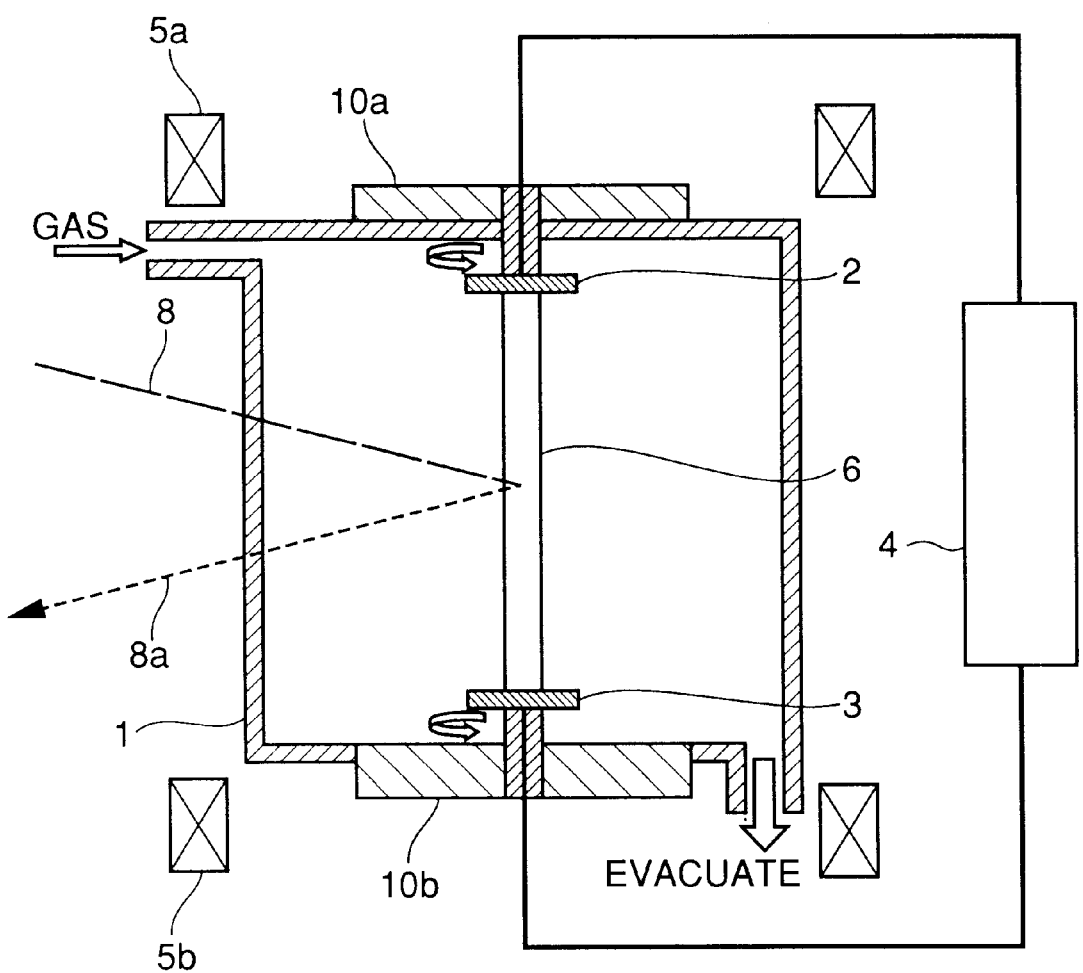
FIG. 7 is a cross sectional view representing the arrangement of a plasma generating apparatus according to a third embodiment of the present invention.
Figure 8:
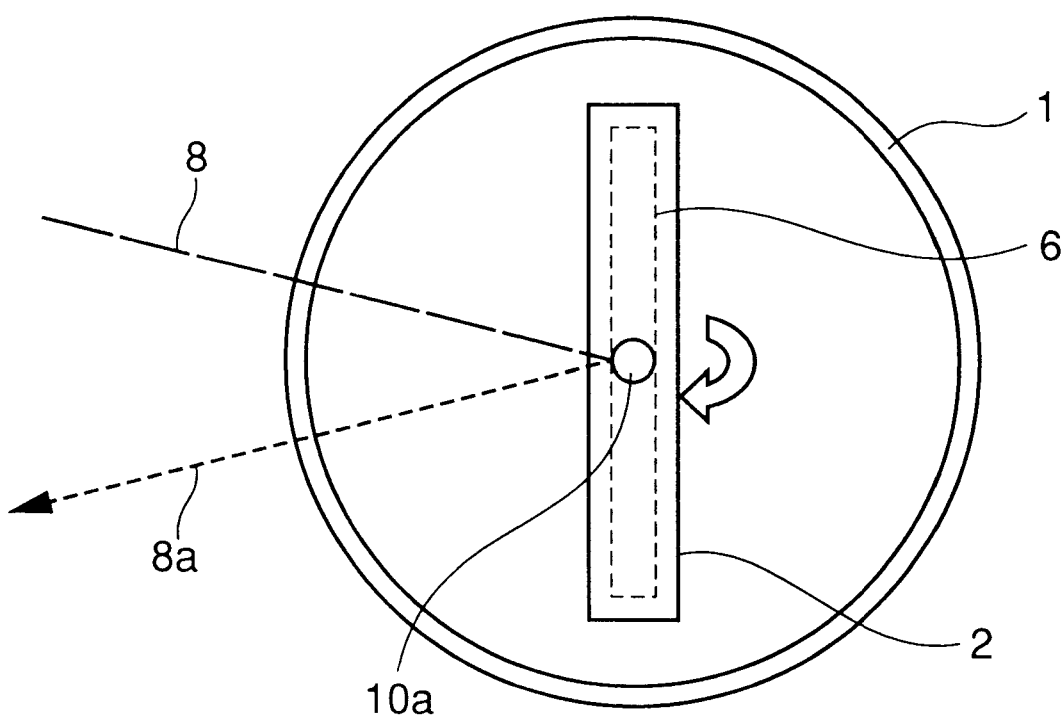
FIG. 8 is a cross sectional view of the plasma generating apparatus, seen from above, according to the third embodiment of the present invention.
Figure 9:
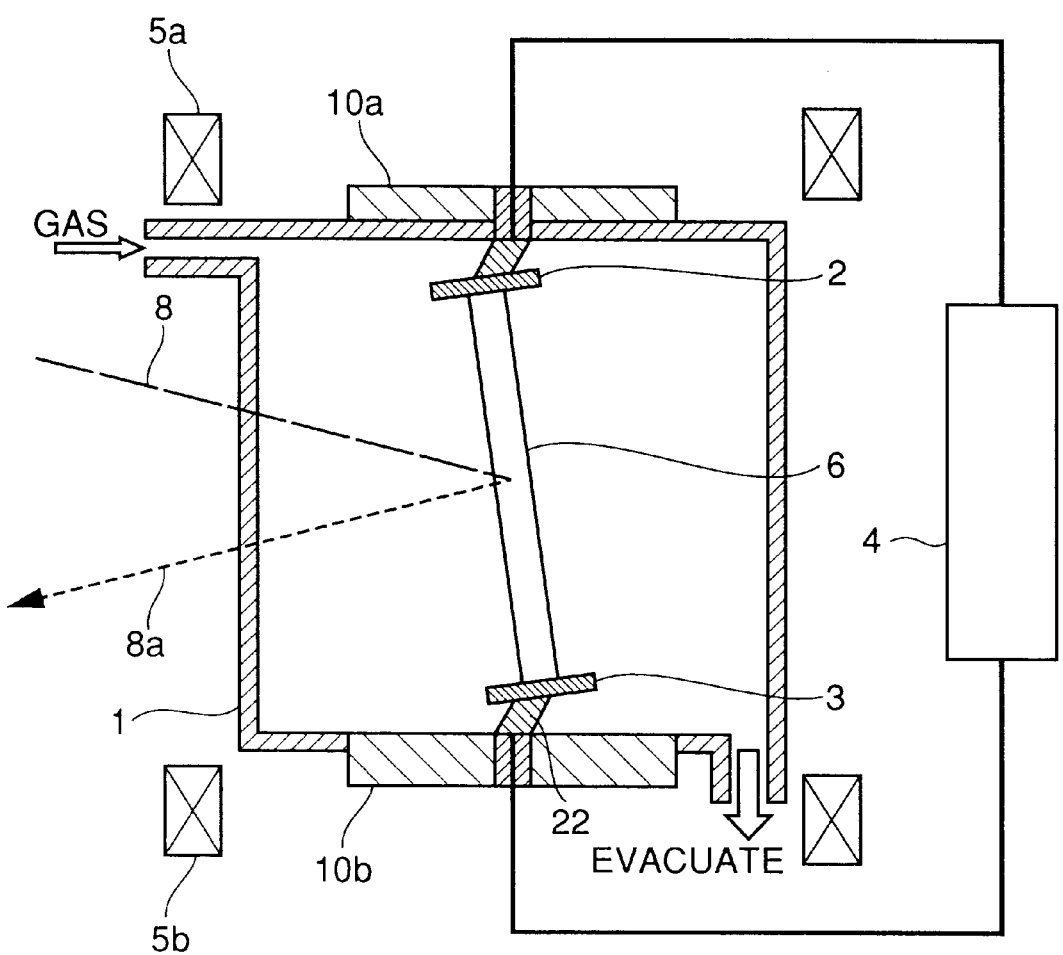
FIG. 9 is a cross sectional view representing the arrangement of a modification of the plasma generating apparatus according to the third embodiment of the present invention.

FIGS. 7 and 9 are cross sectional views representing the arrangement of a plasma generating apparatus according to the third embodiment of the present invention. FIG. 8 is a cross sectional view of the plasma generating apparatus of FIG. 7 seen from above.

The plasma generating apparatus according to the third embodiment differs from the plasma generating apparatus according to any of the above-described embodiments in that it includes a driving mechanism for rotating or tilting at least one of anode 2 and cathode 3.

In the example shown in FIG. 7, the plasma generating apparatus includes an anode 2 of an elongate shape provided with a rotation mechanism 10a and a cathode 3 also provided with a rotation mechanism 10b. Rotation mechanisms 10a and 10b rotate in synchronization so that sheet plasma 6 formed between anode 2 and cathode 3 can be rotated in the azimuthal direction. Thus, this embodiment is capable of the angle control in any azimuthal direction as opposed to the first embodiment.

Although anode 2 and cathode 3 are rotated in the example shown in FIG. 7 as described above, the same effect can be derived by using an anode 2 having a rotation mechanism and a fixed cathode 3 of a wide disc-like shape when applying a positive voltage by the DC (pulse) discharge. In addition, the angle control not only in the azimuthal direction but also in the direction of the elevation angle can be performed by using an anode 2 and a cathode 3 formed by a plurality of electrodes arranged along the paraboloid as shown in FIG. 6 or by using an anode 7 and a cathode 3 having a tilting mechanism 22 as shown in FIG. 9. Furthermore, vacuum container 1 itself can be rotated or elevation angle-controlled in order to perform the angle control of a plasma mirror.

Fourth Embodiment

Figure 10:
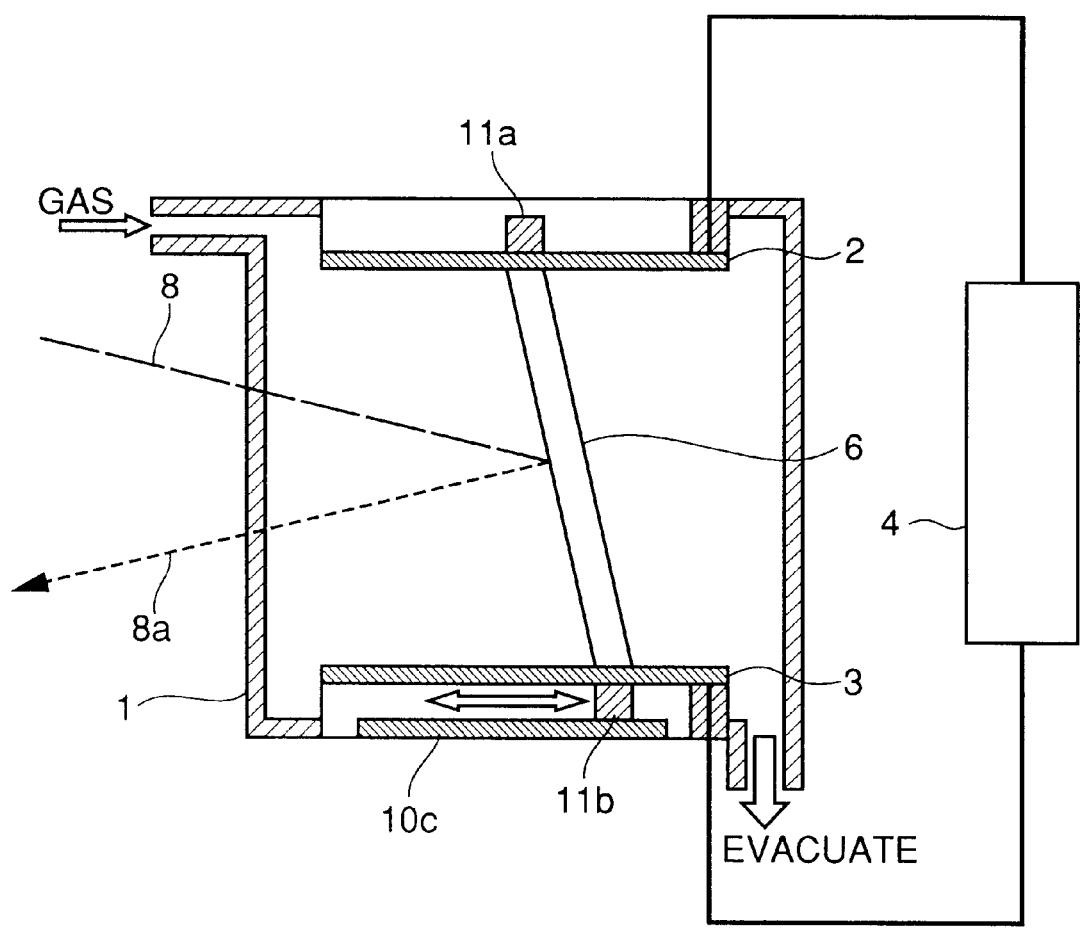
FIG. 10 is a cross sectional view representing the arrangement of a plasma generating apparatus according to a fourth embodiment of the present invention.

FIG. 10 is a cross sectional view representing the arrangement of a plasma generating apparatus according to the fourth embodiment of the present invention.

In the fourth embodiment, permanent magnets 11a and 11b are disposed from the backsides of an anode 2 and a cathode 3. For example, rod permanent magnets are used, and the plurality of permanent magnet 11a on the anode side is set to the north pole, while the polarity of permanent magnet 11b on the cathode side is set to the south pole.

In the plasma generating apparatus thus configured, the direction of the magnetic field lines is toward the bottom of FIG. 10 so that the charge particles in the plasma that is formed travel along the magnetic field lines, thereby forming sheet plasma 6. By providing a magnet driving mechanism 10c which moves permanent magnet 11b on the cathode 3 side in the horizontal direction, oblique magnetic field lines can be provided and sheet plasma 6 would be formed along the oblique direction of the magnetic field lines. Thus, the angle control of sheet plasma 6 in the direction of the elevation angle becomes possible. Moreover, magnet driving mechanism 10c may be provided on the anode 2 side or to both anode 2 and cathode 3.

The strength of magnetic fields of permanent magnets 11a and 11b is extremely strong in the vicinity of the magnets, but is sharply weakened at a distance. Thus, the method described in this example is effective for fine adjustment in the angle control in the direction of the elevation angle.

Fifth Embodiment

Figure 11:
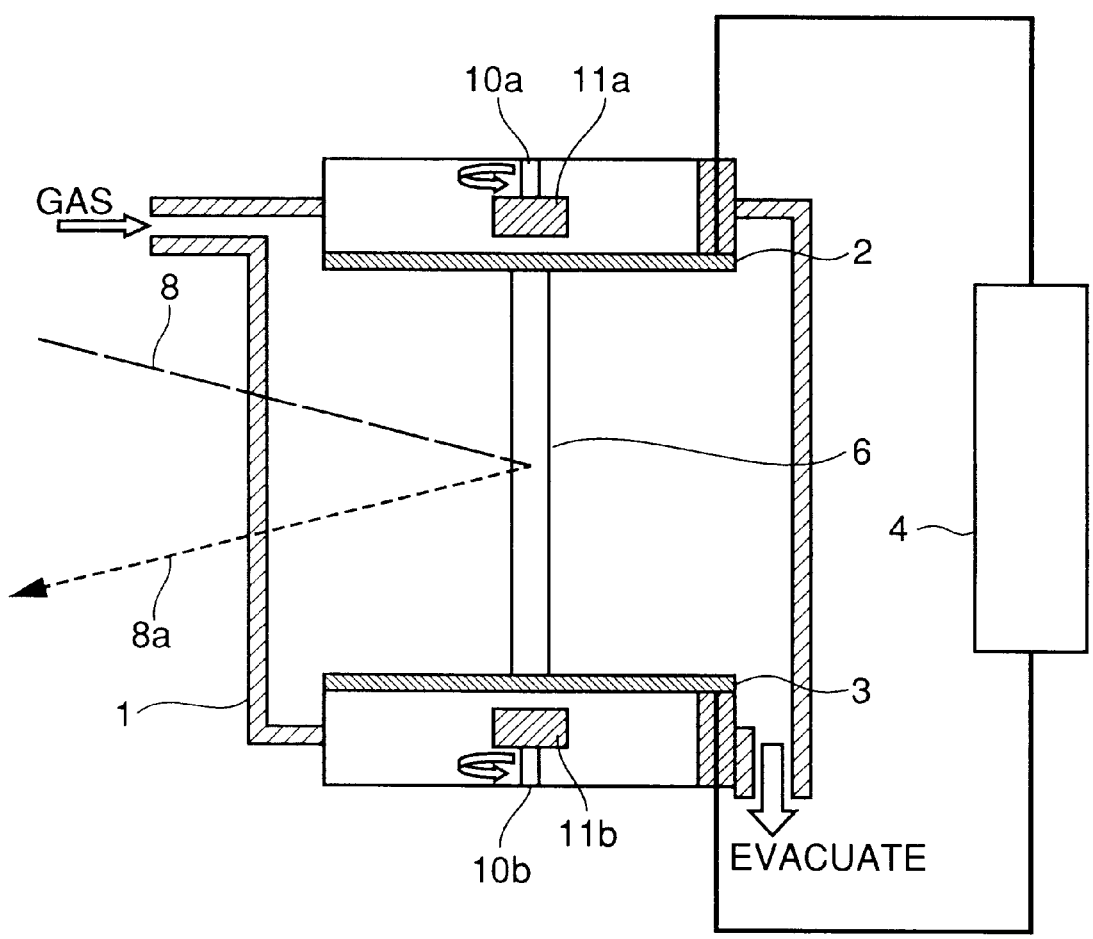
FIG. 11 is a cross sectional view representing the arrangement of a plasma generating apparatus according to a fifth embodiment of the present invention.
Figure 12:
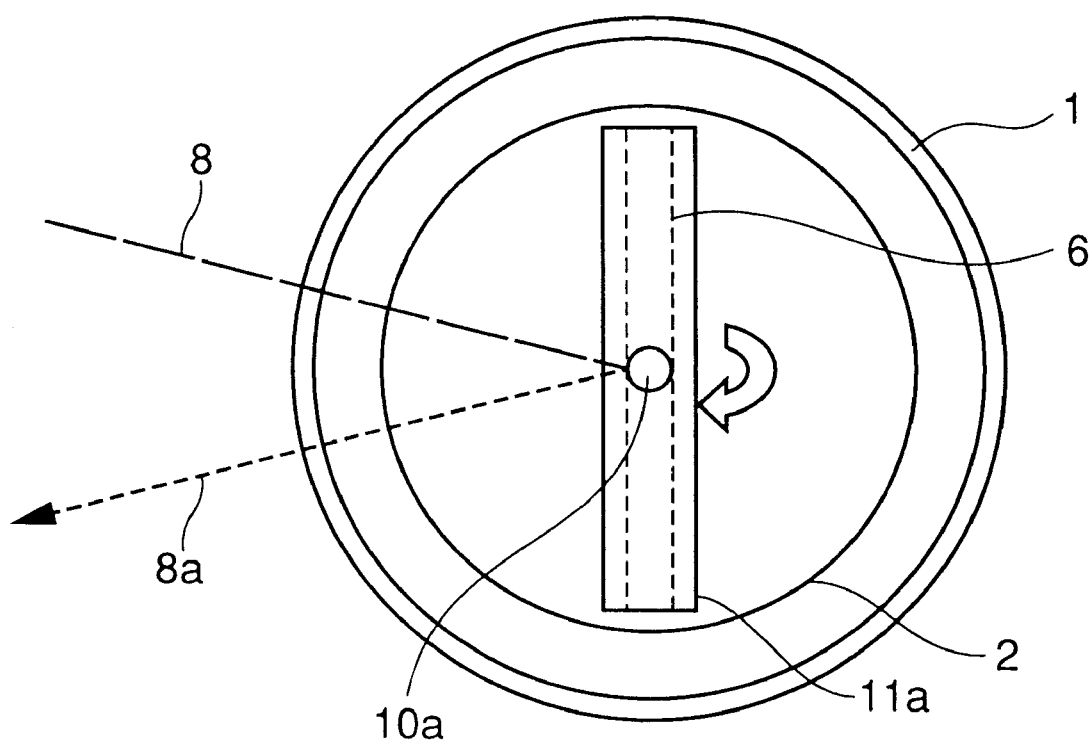
FIG. 12 is a cross sectional view of the plasma generating apparatus, seen from above, according to the fifth embodiment of the present invention.

FIG. 11 is a cross sectional view representing the arrangement of a plasma generating apparatus according to the fifth embodiment of the present invention. FIG. 12 is a cross sectional view of the plasma generating apparatus of FIG. 11 seen from above.

In the fifth embodiment, permanent magnets 11a and 11b are disposed on the backsides of anode 2 and cathode 3, and rotation mechanisms 10a and 10b are provided which can rotate at least one of permanent magnets 11a and 11b. For instance, permanent magnets 11a and 11b have a rod-like shape, and the polarities of permanent magnet 11a on the anode side and the permanent magnet 11b on the cathode side are set to the north pole (or the south pole). In addition, rotation mechanisms 10a and 10b rotate in synchronism.

In the plasma generating apparatus thus configured, the rotation of sheet plasma 6 can be effected with the rotation of permanent magnets 11a and 11b so that the angle control of sheet plasma 6 in any given azimuthal direction becomes possible.

Sixth Embodiment

Figure 13:
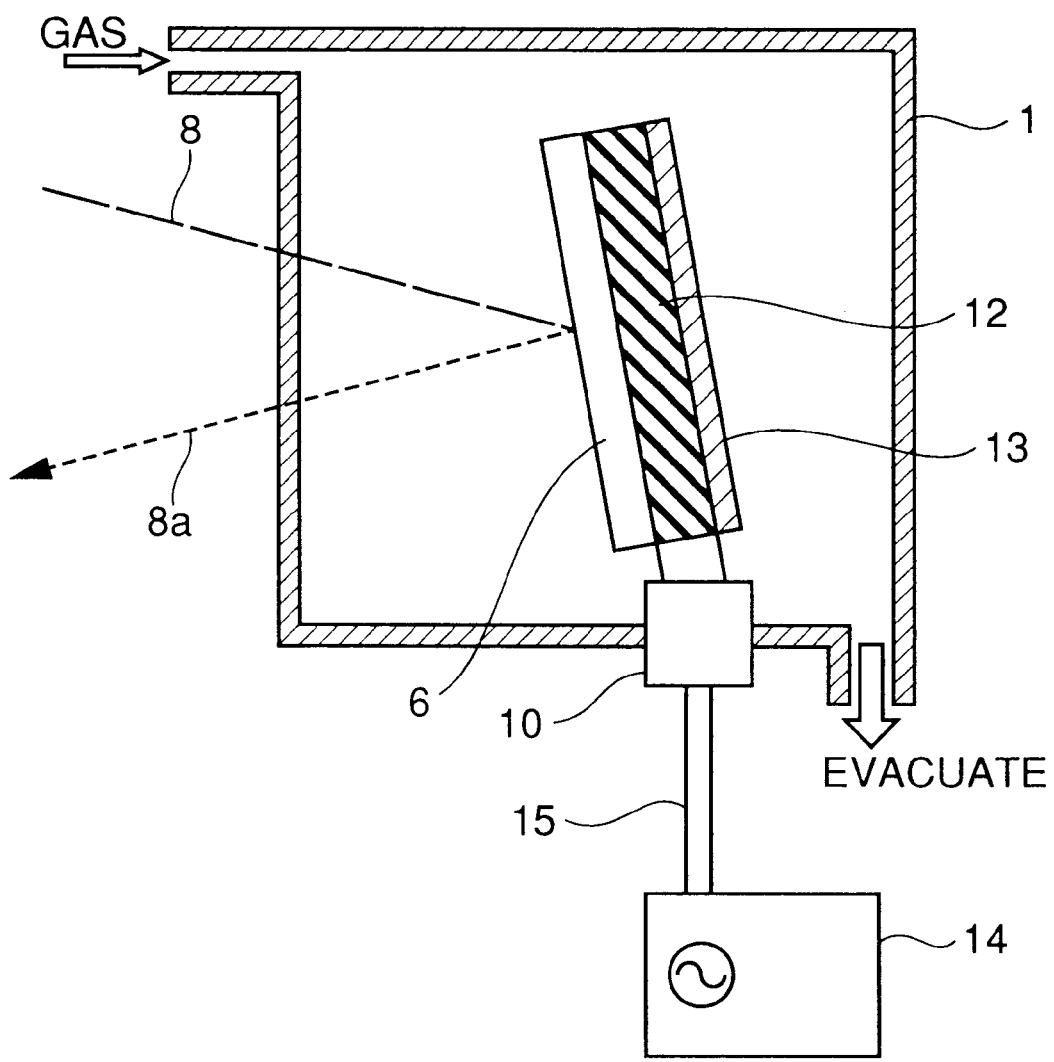
FIG. 13 is a cross sectional view representing the arrangement of a plasma generating apparatus according to a sixth embodiment of the present invention.

FIG. 13 is a cross sectional view representing the arrangement of a plasma generating apparatus according to the sixth embodiment of the present invention.

As shown in FIG. 13, the plasma generating apparatus includes a vacuum container 1, a plate-like dielectric 12, a metal plate 13, a driving mechanism 10 for rotating or tilting dielectric 12 and metal plate 13, a high-frequency power supply 14, and a coaxial cable 15 for transmitting the high-frequency electromagnetic wave to dielectric 12.

In the plasma generating apparatus thus configured, a high-frequency electromagnetic wave generated by high-frequency power supply 14, for instance, microwaves of 2.45 GHz, is introduced to dielectric 12 via coaxial cable 15. The microwaves propagate along a surface of dielectric 12, and a surface wave plasma (sheet plasma) 6 is formed on the surface of dielectric 12. Dielectric 12 can be moved with driving mechanism 10 to allow the angle control in the azimuthal direction and in the direction of the elevation angle.

Since no cut-off density exists, the surface wave plasma can be densified mainly by the adjustment of the microwave source power. Thus, even when the frequency of the incident electromagnetic waves 8 is very high, electromagnetic waves 8 can be reflected using the sheet plasma 6.

Moreover, examples of dielectric 12 include quartz, ceramic, and the like. Dielectric 12 can be adhered to metal plate 13, but preferably, is fitted into metal plate 13 or is fixed to metal plate 13 using a bolt or the like. In addition, the surface of dielectric 12 may be curved, and for instance, may be parabolic.

As shown in FIG. 13, metal plate 13 is attached on one side of dielectric 12. Consequently, sheet plasma 6 can be produced on the one side alone of dielectric 12 so that a plasma of a desired density can be obtained at a low power. In addition, any other material besides metal plate 13 can be employed as long as the material prevents the formation of the plasma on one side of dielectric 12. For instance, a high-frequency non-transmitting material or a high-frequency electromagnetic wave absorbing material can be used.

The sixth embodiment is effective when a plasma of a given shape is required, since surface wave plasma 6 is formed according to the shape of dielectric 12.

Seventh Embodiment

Figure 14:
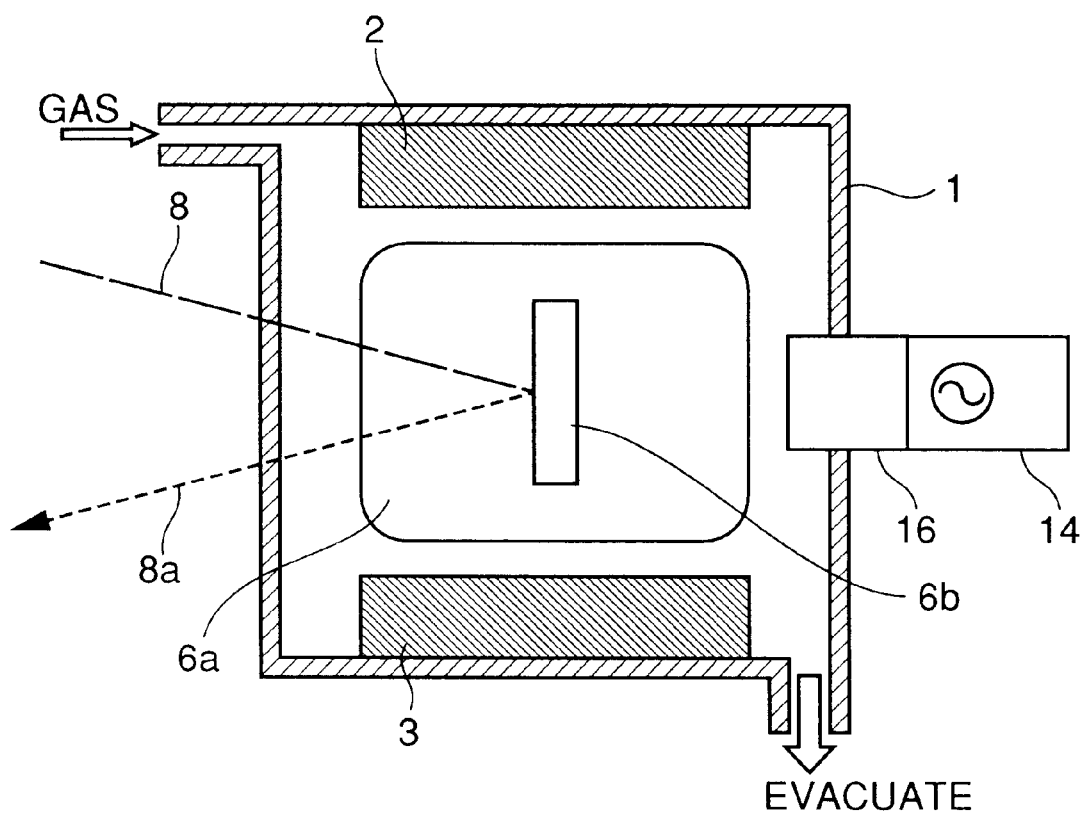
FIG. 14 is a cross sectional view of a plasma generating apparatus related to the description of the principle of high-density plasma formation according to a seventh embodiment of the present invention.

FIG. 14 is a cross sectional view of a plasma generating apparatus related to the description of the principle of the high-density plasma formation according to the seventh embodiment of the present invention. The plasma generating apparatus shown in FIG. 14 includes a vacuum container 1, an anode 2, a cathode 3, a high-frequency power supply 14, and a high-frequency antenna 16.

In the plasma generating apparatus thus configured, a plasma is formed between anode 2 and cathode 3 by a high-voltage power supply, not shown. When incident electromagnetic waves 8 of interest is of a high-frequency that transmits through the plasma or when the plasma is a low-density plasma, the high-frequency electromagnetic wave transmitted from high-frequency power supply 14, for instance, microwaves, is propagated into the plasma and is absorbed in the plasma so as to densify the plasma in a location in which the microwaves are absorbed. Thus, even when the incident electromagnetic waves 8 propagate in a low-density plasma 6a region, electromagnetic waves 8 can be reflected in a high-density plasma 6b region.

Here, low-density plasma 6a region refers to the density region in which the frequency of the plasma is lower than the frequency of electromagnetic waves 8 to be reflected, while high-density plasma 6b region refers to the density region in which the frequency of the plasma is higher than the frequency of electromagnetic waves 8 to be reflected.

The low-density plasma can be produced using techniques such as an RF (radio frequency) discharge, an AC (alternating current) discharge, a DC discharge, and a microwave discharge. The high-density plasma can be produced by radiating a high frequency electromagnetic wave whose frequency is higher than the plasma frequency of the low-density plasma from an antenna and by propagating the high-frequency electromagnetic wave in the low-density plasma. More specifically, the electromagnetic waves supplied into the low-density plasma are absorbed in the plasma due to the collision of electrons and the gas or due to the attenuation of the electromagnetic waves, and a plasma of a high density can be formed in the region where the electromagnetic waves are absorbed.

Figure 15:
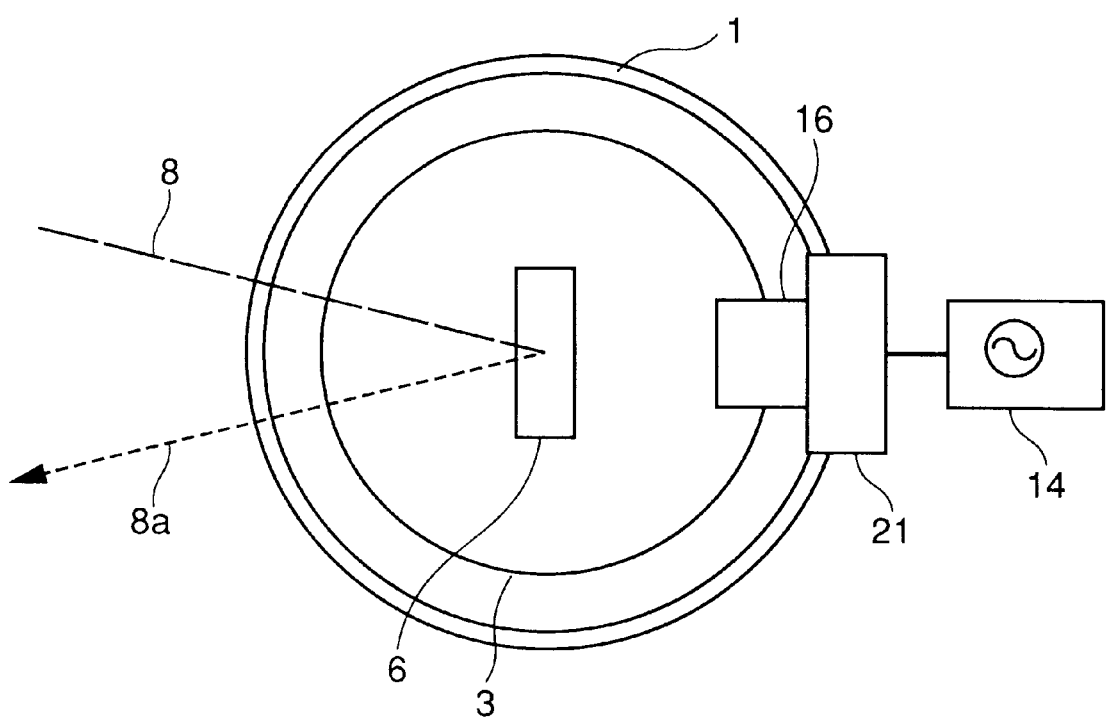
FIG. 15 is a cross sectional view of the plasma generating apparatus, seen from above, according to the seventh embodiment of the present invention.

FIG. 15 shows a plasma generating apparatus provided with a moving mechanism 21 for a high-frequency antenna 16. High-frequency antenna 16 can be moved by providing such a moving mechanism 21. In this case, high-frequency antenna 16 can be moved in the circumferential direction of vacuum container 1. Thus, the position of formation, the angle, and the like of sheet plasma (high-density plasma) 6 can be adjusted. Moreover, according to this embodiment, fine adjustment of the position of formation, the angle, and the like of sheet plasma 6 can be performed.

Figure 16:
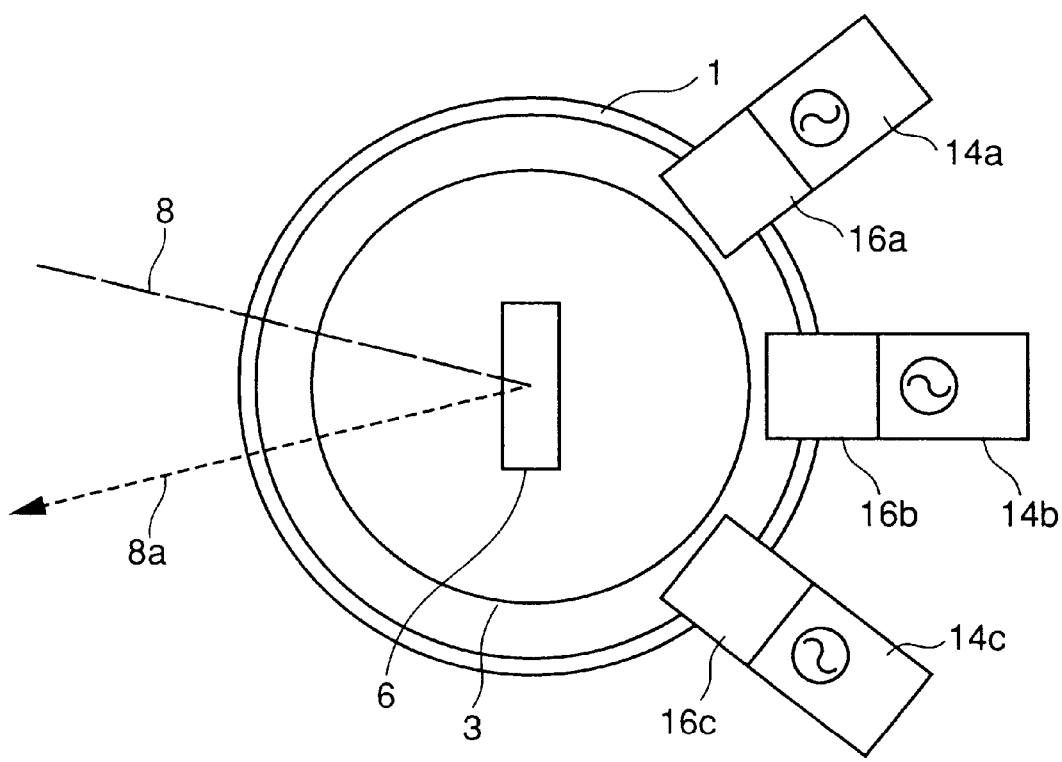
FIG. 16 is a cross sectional view of a modification of the plasma generating apparatus, seen from above, according to the seventh embodiment of the present invention.

In addition, as shown in FIG. 16, a plurality of high-frequency antennas 16a to 16c and a plurality of high-frequency power supplies 14a to 14c can be provided. In this case, the high frequency electromagnetic wave is radiated from different high-frequency antennas 16a to 16c so as to change the position of formation, the angle, and the like of sheet plasma 6.

Figure 17:
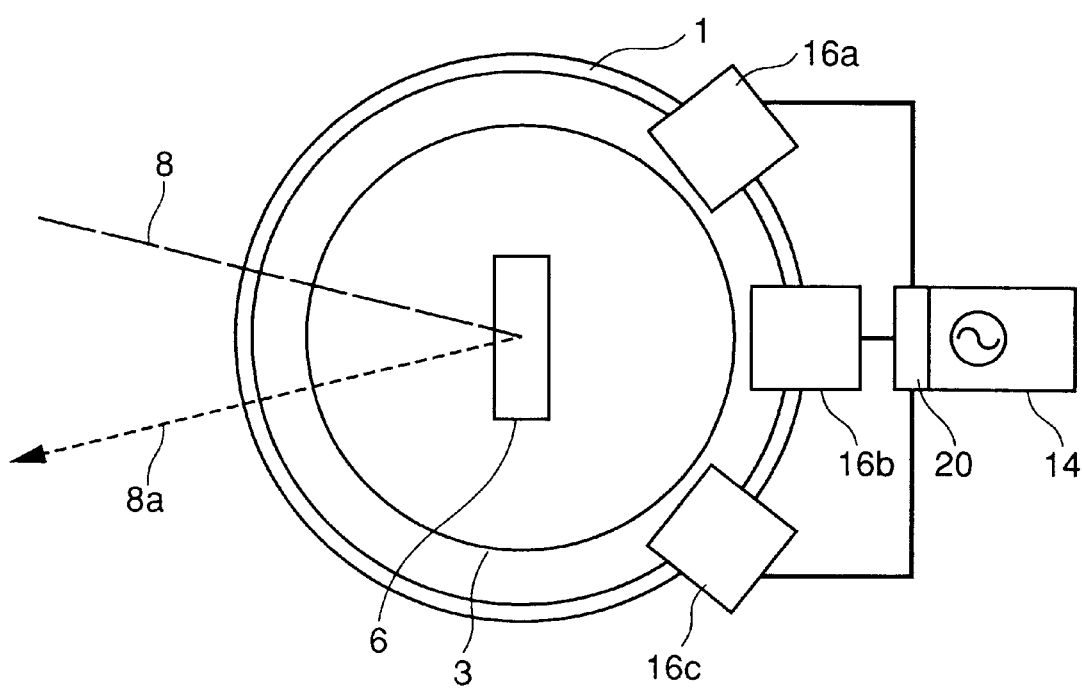
FIG. 17 is a cross sectional view of another modification of the plasma generating apparatus, seen from above, according to the seventh embodiment of the present invention.

FIG. 17 shows a modification of the plasma generating apparatus shown in FIG. 16. As shown in FIG. 17, high-frequency antennas 16a to 16c can be connected to a common high-frequency power supply 14 via a switching element 20. As a result, the device can be made more compact. In this case, the position of formation, the angle, and the like of sheet plasma 6 can be changed as in the other cases described above.

The seventh embodiment is effective when only a low-density plasma can be formed between anode 2 and cathode 3 or when the incident electromagnetic waves 8 is of a high frequency, since the low-density plasma region is densified by plasma heating.

Eighth Embodiment

Figure 18:
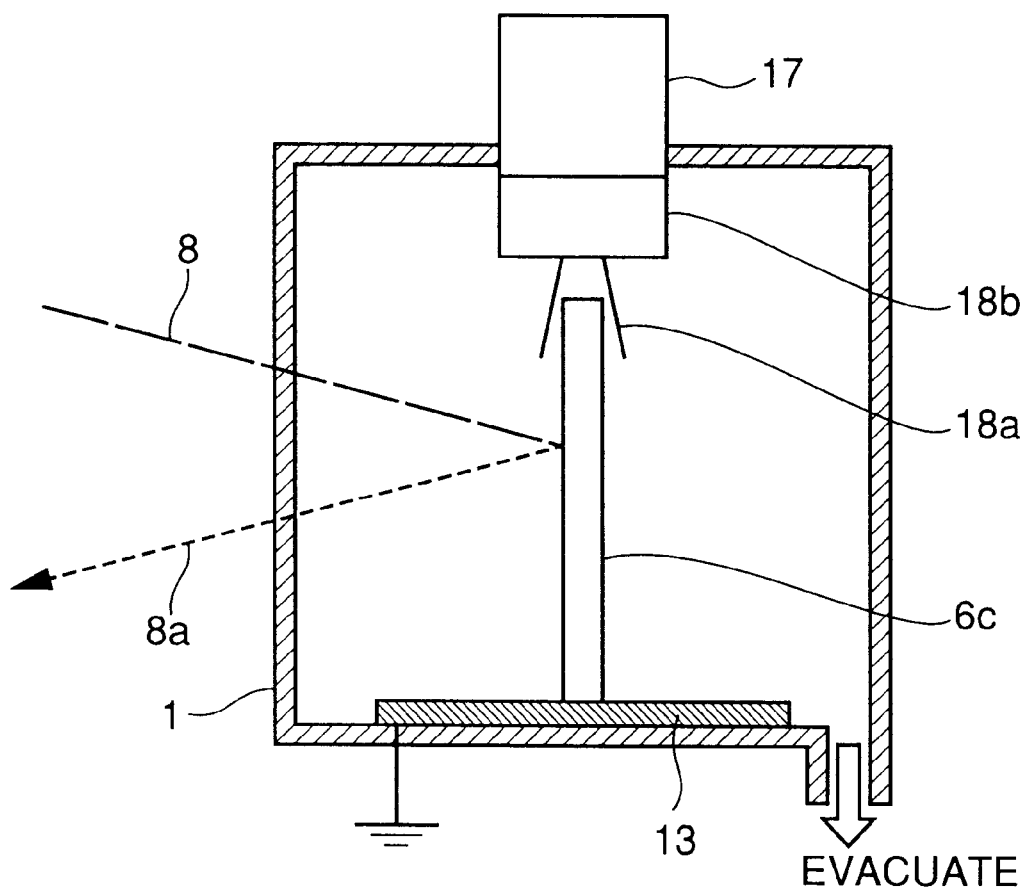
FIG. 18 is a cross sectional view representing the arrangement of an electron beam plasma generating apparatus according to an eighth embodiment of the present invention.

FIG. 18 is a cross sectional view representing the arrangement of a plasma generating apparatus according to the eighth embodiment of the present invention. As shown in FIG. 18, the plasma generating apparatus includes a vacuum container 1, a metal plate 13, an electron beam source 17, a nozzle 18a, and a nozzle driving mechanism 18b.

In the electron beam plasma generating apparatus thus configured, an electron beam plasma (sheet plasma) 6c of a sufficient density relative to the incident electromagnetic waves 8 is jet out via nozzle 18a toward metal plate 13 which is grounded. At this time, nozzle driving mechanism 18b can be actuated in order to jet out the electron beam at any desired angle so that the angle control of electron beam plasma 6c becomes possible.

For instance, nozzle 18a can be rotated using nozzle driving mechanism 18b to perform the angle control of the sheet plasma in the azimuthal direction. Moreover, nozzle 18a can be tilted using nozzle driving mechanism 18b to perform the angle control of the sheet plasma in the direction of the elevation angle.

Ninth Embodiment

Figure 19:
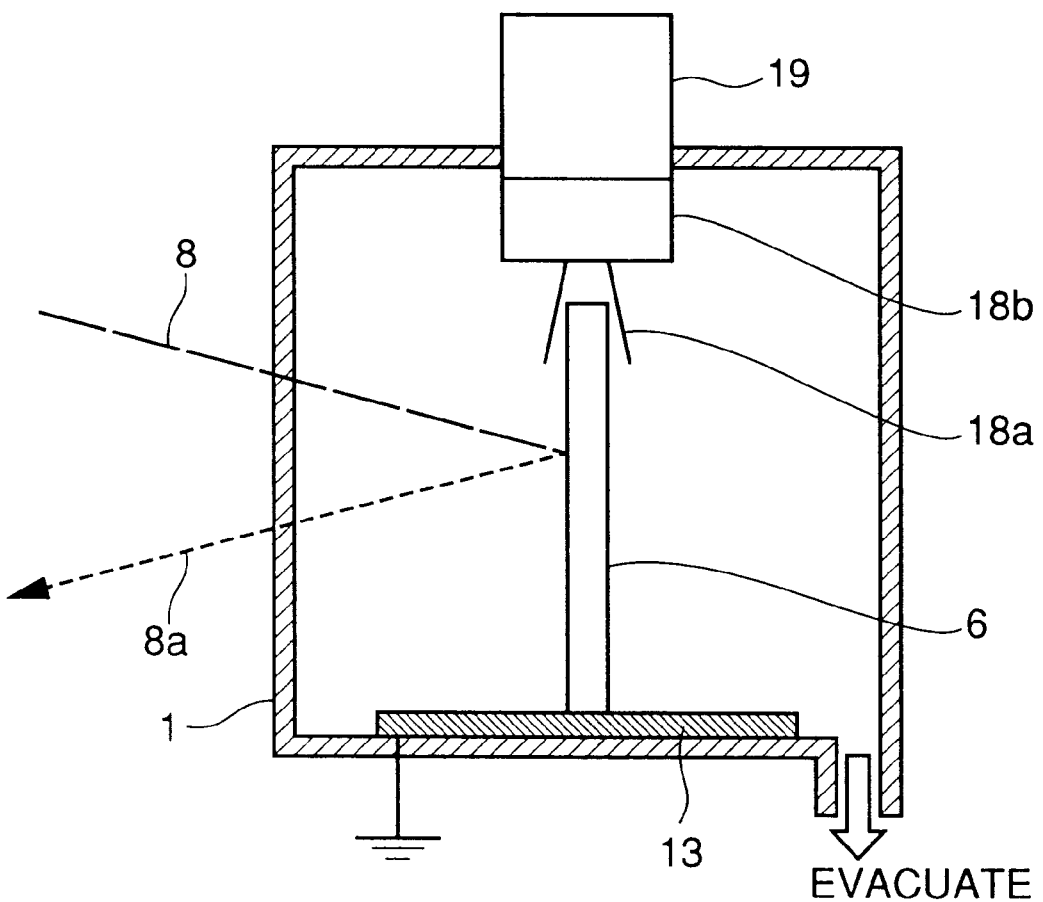
FIG. 19 is a cross sectional view representing the arrangement of a plasma generating apparatus according to a ninth embodiment of the present invention.

FIG. 19 is a cross sectional view representing the arrangement of a plasma generating apparatus according to the ninth embodiment of the present invention. The plasma generating apparatus according to the ninth embodiment differs from the plasma generating apparatus according to the eighth embodiment in that the former is provided with a plasma source 19.

Nozzle 18a can be driven by nozzle driving mechanism 18b so as to jet out the plasma at any desired angle, which allows the angle control of sheet plasma 6.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A plasma generating apparatus, comprising:
   a chamber;
   an anode and a cathode within said chamber;
   a power supply for applying a voltage to said anode and said cathode to form a sheet plasma between said anode and said cathode, the sheet plasma reflecting directional electromagnetic waves;
   a first magnet on said anode;
   a second magnet on said cathode; and
   magnet moving means for moving at least one of said first magnet with respect to said anode and said second magnet with respect to said cathode to change an angle of the sheet plasma within said chamber.

2. The plasma generating apparatus according to claim 1, wherein said magnet moving means includes a rotation mechanism for rotating at least one of said first magnet with respect to said anode and said second magnet with respect to said cathode.

3. The plasma generating apparatus according to claim 1, wherein said magnet moving means includes a rotation mechanism for sliding at least one of said first magnet with respect to said anode and said second magnet with respect to said cathode.

4. A plasma generating apparatus, comprising:
   a chamber;
   an anode and a cathode within said chamber;
   a power supply for applying a voltage to said anode and said cathode to form a sheet plasma between said anode and said cathode, the sheet plasma reflecting directional electromagnetic waves; and
   tilting means for tilting at least one of said anode and said cathode relative to said chamber to change an angle of the sheet plasma relative to the chamber.

5. A plasma generating apparatus, comprising:
   a chamber;
   an anode within said chamber and including a plurality of first electrodes;
   a cathode within said chamber and including a plurality of second electrodes;
   a power supply for applying a voltage to the first and second electrodes to form a sheet plasma that reflects directional electromagnetic waves; and
   first and second switching means for switching groups of said first and second electrodes to which the voltage from said power supply is applied to change at least one of an angle and shape of the sheet plasma.

6. The plasma generating apparatus according to claim 5, wherein said first and second electrodes are respectively arranged in a matrix.

7. The plasma generating apparatus according to claim 5, wherein the voltage is one of a pulse voltage, a high-frequency voltage, and a direct current voltage.

8. The plasma generating apparatus according to claim 5, wherein at least one of said cathode and said anode has a flat-plate shape.

9. The plasma generating apparatus according to claim 5, wherein at least one of opposing surfaces of said cathode and said anode is a curved surface.

10. The plasma generating apparatus according to claim 5, wherein said first electrodes are mutually electrically insulated from each other and said second electrodes are mutually electrically insulated from each other.

* * * * *